United States Patent [19]

Anderson

[11] 4,391,704
[45] Jul. 5, 1983

[54] GAS-EXTRACTION ARRANGEMENT FOR WASTEWATER SETTLING TANK

[75] Inventor: Arthur Anderson, Cypress, Calif.

[73] Assignee: Fischer & Porter Company, Warminster, Pa.

[21] Appl. No.: 287,791

[22] Filed: Jul. 28, 1981

[51] Int. Cl.³ .................... B01D 19/00; C02F 1/20
[52] U.S. Cl. .................... 210/188; 55/189; 55/196; 55/387; 210/218; 210/539
[58] Field of Search .................... 55/36, 52, 53, 55, 159, 55/189, 192, 196, 387; 210/603, 608, 750, 188, 218, 754, 759, 538, 539, 540, DIG. 9

[56] References Cited

U.S. PATENT DOCUMENTS

| | | | |
|---|---|---|---|
| 1,690,692 | 11/1928 | Imhoff et al. | 210/608 |
| 2,360,812 | 10/1944 | Kelly et al. | 210/608 |
| 2,422,394 | 6/1947 | Carter | 210/608 |
| 3,017,951 | 1/1962 | Wiley | 210/188 |
| 4,039,458 | 8/1977 | Maisonneuve et al. | 210/539 |
| 4,162,147 | 7/1979 | Haverkamp | 210/188 |
| 4,175,041 | 11/1979 | Drnevich et al. | 210/188 |
| 4,256,837 | 3/1981 | Fluri et al. | 210/188 |

*Primary Examiner*—Peter A. Hruskoci
*Attorney, Agent, or Firm*—Michael Ebert

[57] ABSTRACT

A gas-extraction arrangement for a settling tank included in a wastewater treatment system, the tank having an outlet zone defined by an effluent trough at least one side of which has a weir to permit clarified water from the tank to spill therein. The trough is covered by a hood which acts to confine the atmosphere thereabove to the hood region, at least one side of the hood protruding into the tank water at a point spaced from the weir to create a scum baffle preventing grease and other floating matter from being discharged into the trough. The hood is coupled to a suction pump which acts to draw noxious gases emitted as the water spills over the weir into a gas-control system or other means for deactivating the gases.

16 Claims, 7 Drawing Figures

U.S. Patent  Jul. 5, 1983  Sheet 1 of 2  4,391,704
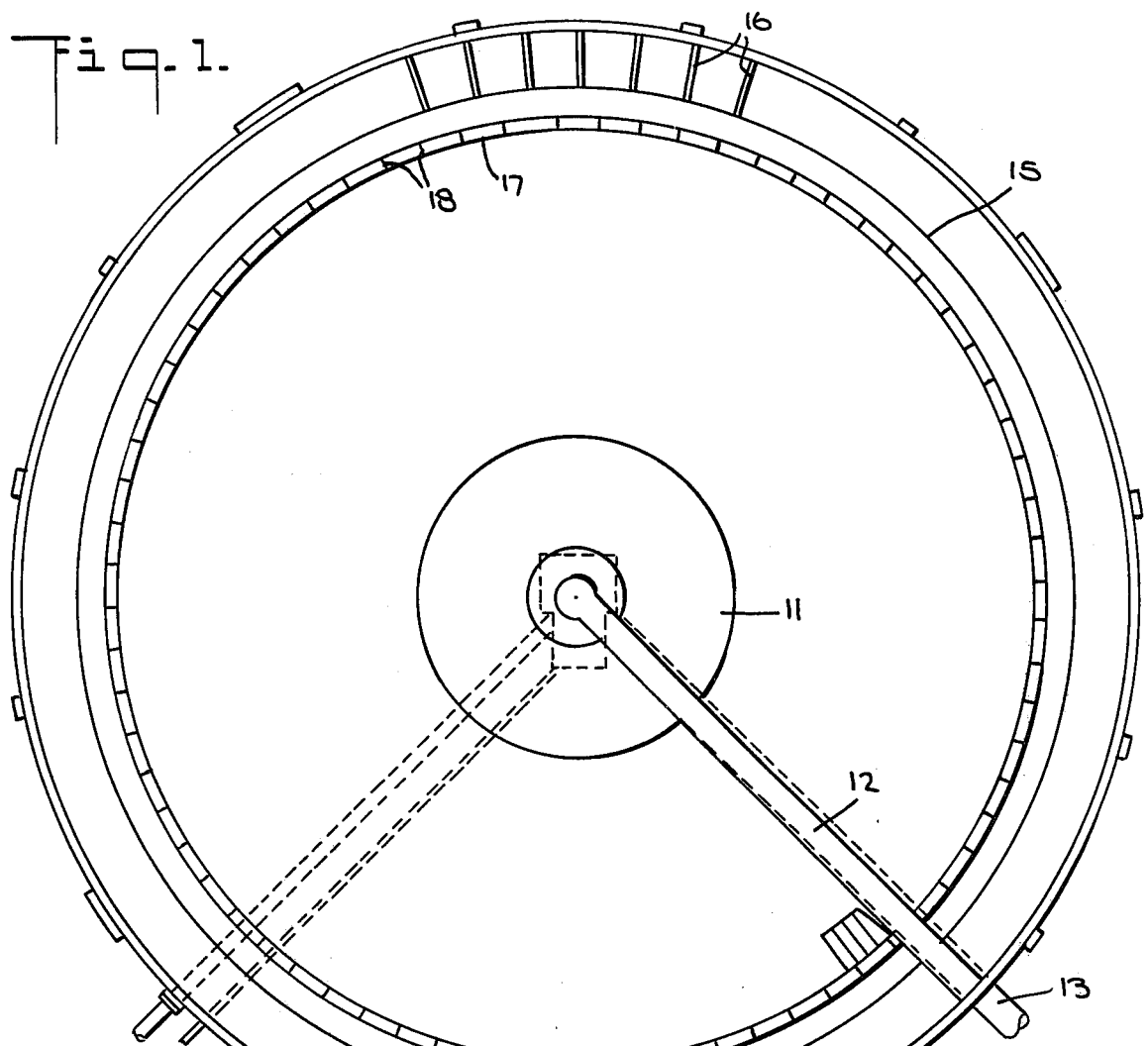
Fig. 1.
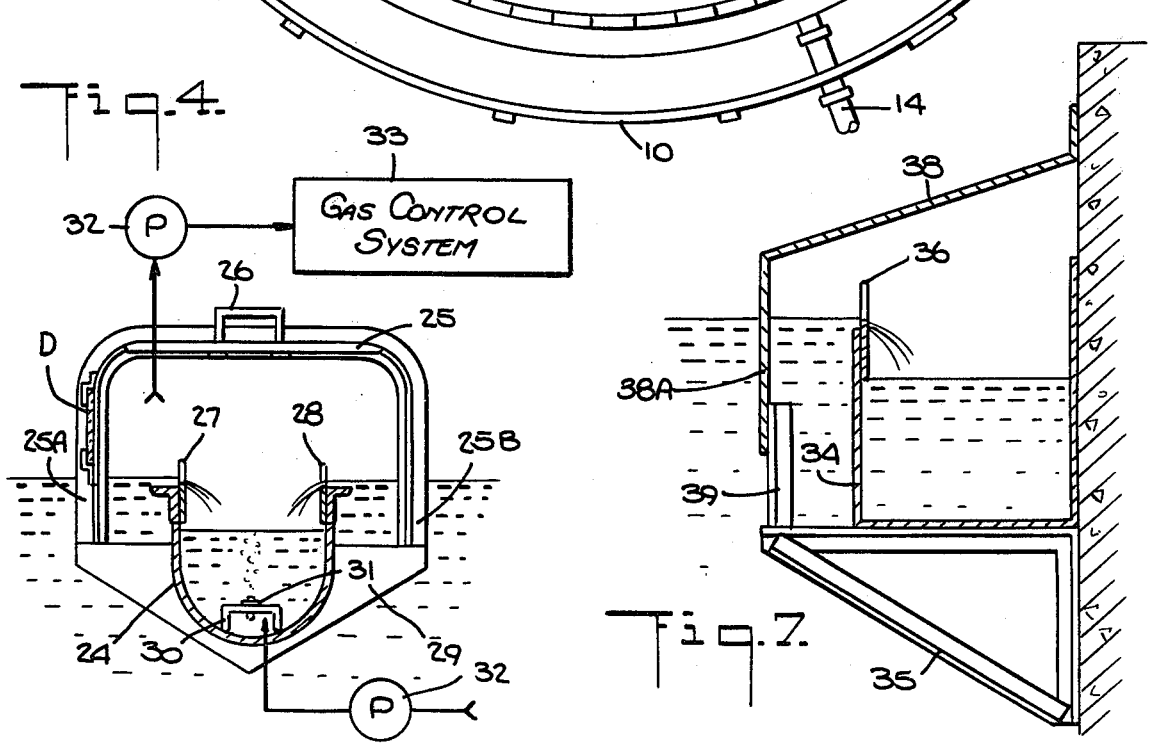
Fig. 4.
Fig. 7.

GAS-EXTRACTION ARRANGEMENT FOR WASTEWATER SETTLING TANK

BACKGROUND OF THE INVENTION

This invention relates generally to wastewater treatment system, and more particularly to an outlet arrangement for the extraction of odoriferous and noxious fumes emanating from the contents of a clarifier.

Sedimentation is the process by which suspended particles heavier than water are removed by gravitational settling. Sedimentation which comes into play in the natural purification of streams and lakes is also widely used in the treatment of sewage and industrial wastes.

Systems for treating sewage and industrial wastes typically include preliminary settling tanks that collect a good part of the suspended load of impurities before the clarified effluent is discharged into receiving waters or is subjected to further treatment in secondary settling tanks. In the secondary or final settling tanks, there are collected those matters which have been converted into settleable solids or otherwise rendered settleable by biological or related treatment techniques. To improve the efficiency of the system, flocculating or precipitating agents may be added to sewage prior to sedimentation.

A settling tank or basin has four functional zones; namely, an inlet zone, a settling zone, a sludge zone and an outlet zone. For high efficiency, inlets must distribute flow and suspend matter as uniformly as possible within the tank. In the sludge zone, sludge is worked into a sump from which it is withdrawn by gravity or by a pumping action. The main concern of the present invention is with the outlet zone in which the control of outflow is usually effected by a weir attached to one or both sides of an outlet trough or launder which acts as a lateral spillway.

In an arrangement in accordance with the invention, the structure and operation of the outlet zone is such as to minimize the emission of odoriferous and noxious fumes into the atmosphere. Because incoming waste is saturated with noxious gases and easily volatilized compounds, some degree of odor control is generally necessary in a liquid waste treatment system. In sewage, the objectionable compound which predominates is hydrogen sulfide, a colorless gas which has an offensive odor. This gas is highly toxic and a strong irritant to eyes and mucous membranes. Hydrogen sulfide is almost always present in sewage, for it is the product of anaerobic decomposition by bacteria present in the sewage and in the sewage treatment system.

With settling tanks and sewage collection systems having significant detention times, the generation of hydrogen sulfide, particularly in warm weather, can be so vigorous that the gases released from the tank can create serious problems. Apart from its unpleasant odor, the presence of hydrogen sulfide in the atmosphere is hazardous to personnel in the vicinity of the tank and may cause permanent injury and even death. And since hydrogen sulfide will condense with water or concrete or metal surfaces to form sulfuric acid, this acid may severely corrode the structures.

Moreover, with sewage treatment in activated sludge units, the introduction therein of hydrogen sulfide acts to promote the growth of thirotrix bacteria, a filamentous organism which compacts poorly in the settling process, thereby degrading the performance of the facility.

Various approaches have heretofore been taken to minimize the adverse effects of hydrogen sulfide. Thus, strong oxidizing agents such as hydrogen peroxide have been added to the sewage system to inhibit the anaerobic bacteria responsible for generating hydrogen sulfide, the agents oxidizing the sulfide to form soluble, non-odoriferous orifice sulfite or sulfate compounds.

Another approach heretofore taken is to cover the settling tanks. But this approach leaves much to be desired; for when the tanks are covered with a concrete structure, the reaction of the gases with the structure then gives rise to serious corrosion problems, and the cost of complete covers is very high. Complete coverage of large tanks also creates a large enough volume over the liquid that workers can enter. Therefore, a large volume of air must be blown through this enclosed area to afford a safe working environment for personnel. This large volume of air dilutes the odoriferous compounds and makes them more difficult to treat. Thus prior attempts to solve the problem of odor control, despite their relatively high cost, have been of limited effectiveness.

SUMMARY OF INVENTION

In view of the foregoing, the main object of this invention is to provide a wastewater treatment settling tank having an outlet zone which functions to localize the odoriferous and noxious fumes to the region of the collection trough, from which they are extracted, the settling zone of the tank being uncovered.

The invention is based on the recognition that almost all of the noxious gases generated in a settling tank are released as the clarified water spills over the weirs mounted on the sides of the trough; hence by capturing these hazardous gases in the trough region and transporting the captured gases to a gas-control system or in otherwise disposing of the gases, one is able to reduce the discharge of gases into the atmosphere to an acceptably safe level.

More particularly, it is an object of this invention to provide an outlet zone for settling tank in which the trough is covered by a hood that also functions as a scum baffle. In a conventional outlet zone, a baffle which protrudes into the tank water is mounted adjacent the weir of the trough to prevent grease and other floating matter from being discharged into the trough with the effluent. With the present invention, there is no need for separate baffle plates; for the hood which acts to confine the gases released in the trough has a baffle integral therewith.

Also an object of the invention is to provide a hood for an effluent trough in the outlet of a settling tank which is formed of a material that is chemically immune to the gases released from the effluent, so that no deterioration of the hood occurs.

Inasmuch as the hood which covers the trough is required to collect a relatively small volume of air as compared to a cover placed over the tank, a significant advantage of an arrangement in accordance with the invention is that it is not only more effective than a massive tank cover, but is also substantially less expensive to construct and operate.

Still another object of the invention is to provide a diffuser duct for a trough having pressurized air passing therethrough to agitate the effluent to enhance the stripping of gases therefrom.

Briefly stated, these objects are attained in a settling tank in a wastewater treatment system whose outlet zone is defined by a trough, at least one side of which has a weir to permit clarified water from the tank to spill into the trough. The trough is covered by a hood which acts to confine the atmosphere thereabove to the hood region; at least one side wall of the hood protruding into the water at a point spaced from the weir to create an integral scum baffle to prevent grease and other floating matter from being discharged into the trough along with the effluent. The hood is coupled to a suction pump which acts to draw the noxious gases emitted as the water spills over the weir into a gas-control system or other means for deactivating the gases.

Also provided in the trough is a diffuser duct through which pressurized air flows, the air bubbling through the effluent to enhance the stripping of gases into the confined region above the trough.

OUTLINE OF DRAWINGS

For a better understanding of the invention as well as other objects and further features thereof, reference is made to the following detailed description to be read in conjunction with the accompanying drawings, wherein:

FIG. 1 is a plan view of a circular settling tank which includes an outlet zone;

FIG. 4 illustrates in side view one preferred embodiment of a hooded trough in accordance with the invention for the removal of noxious gases;

FIG. 7 is a side view of a second embodiment of a trough in accordance with the invention.

DESCRIPTION OF INVENTION

Prior Art

Figure 2:
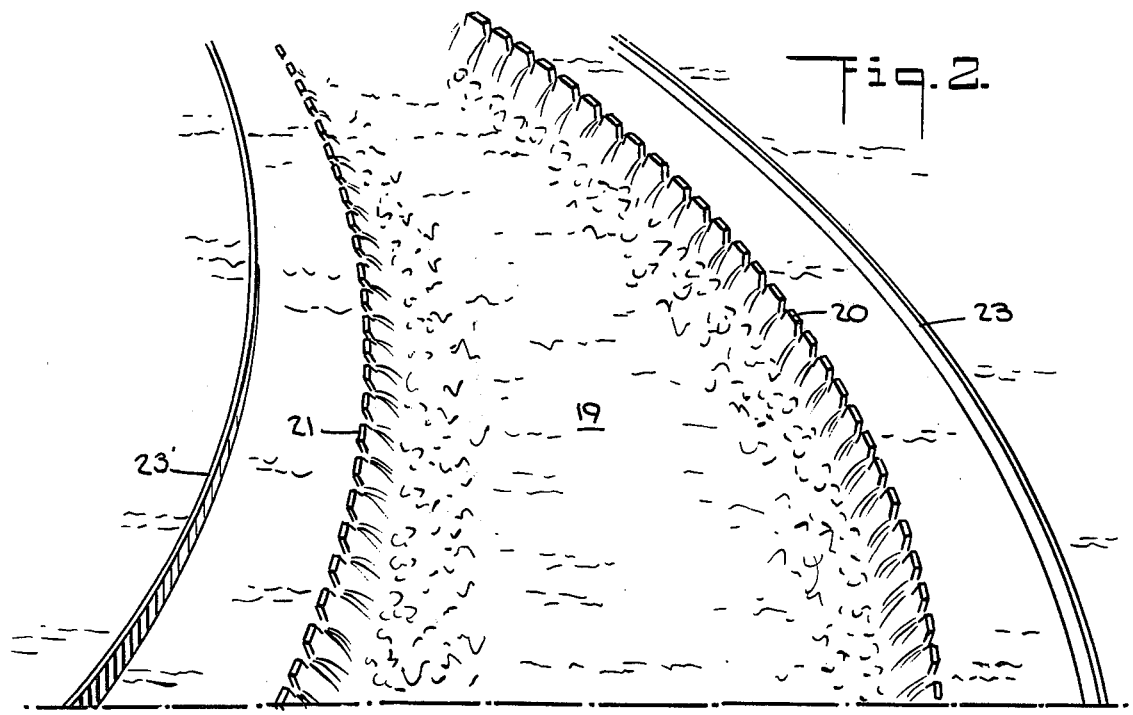
FIG. 2 is a perspective view of a portion of the outlet zone of the tank, with the clarified water being discharged into the trough.

Referring now to FIG. 1, schematically shown is a typical round settling tank for a wastewater treatment system. The tank has a circular outer wall 10 for containing the wastewater to be treated, within which is a central sludge zone 11 having a rotating sludge scraper mechanism therein, the tank being provided with radial access bridge 12. Wastewater is fed into the tank through inlet line 13 while clarified water is taken out through outlet line 14.

The tank is provided adjacent its periphery with an annular effluent trough 15 supported by an array of brackets 16. Concentrically mounted with respect to the trough is a circular scum baffle 17 supported by brackets 18.

Figure 3:
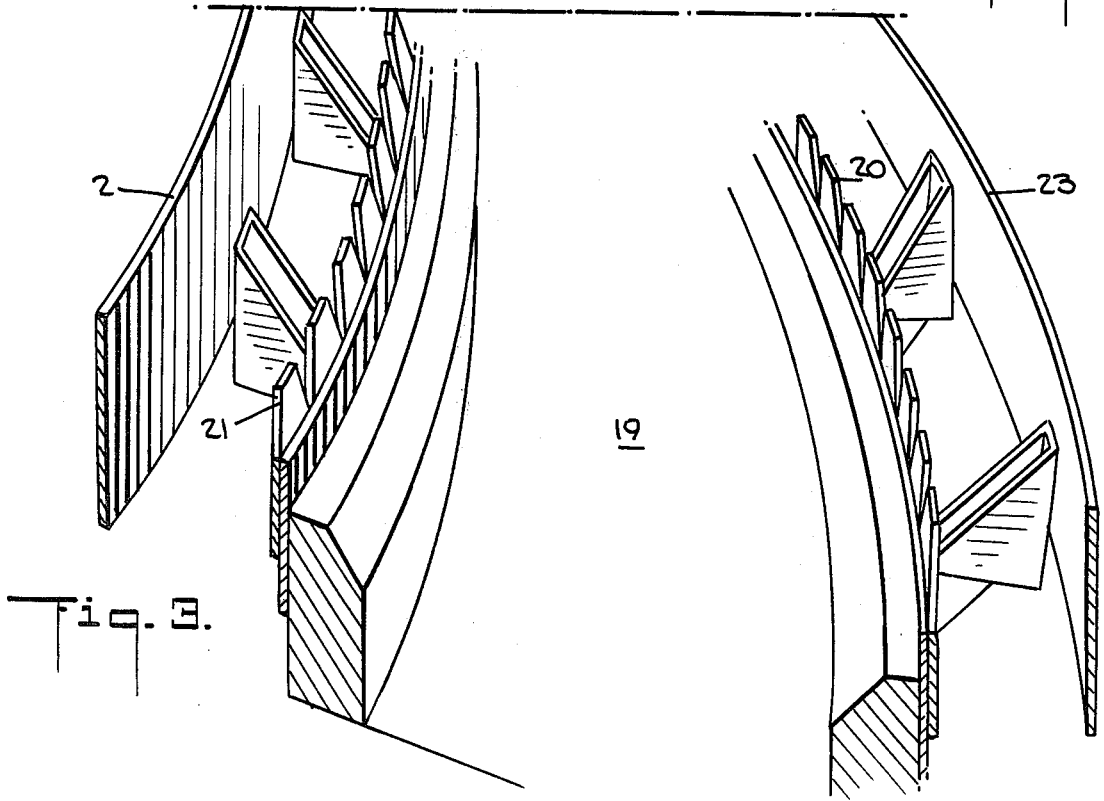
FIG. 3 is the same as FIG. 2 but with the tank and trough empty to expose the supporting structure.

Since the invention is focused on the outlet zone, we shall now consider a known type of outlet zone in greater detail in connection with FIGS. 2 and 3 where there is shown an annular trough 19 whose circular inner and outer sides are provided with toothed weirs 20 and 21 to permit clarified tank water to spill laterally into the trough. Associated with a weir 20 is a circular scum baffle 23 and with weir 21 a circular sum baffle 23'. These baffles protrude into the water to keep scum and other floating matter away from the trough.

In FIG. 2, the tank is shown filled, while in FIG. 3 it is empty to expose the brackets supporting the baffles and showing the toothed formation of the weirs. In the arrangements shown in FIGS. 1 to 3, the tank and the outlet zone therein are uncovered; hence noxious gases generated therein are discharged into and foul the atmosphere. As previously explained, the gases are released mainly from the trough; for the turbulence resulting from the spillage therein tends to promote such release.

First Embodiment

Because the gases emanate largely from the trough, there is no need to cover the tank; for by covering the trough one can capture most of the gases. To this end, as shown in FIG. 4 in connection with a trough 24 having a U-shaped cross section, there is provided a hood 25 to collect the gases, hood 25 having a handle 26 so that it can readily be removed for inspection or other purposes.

Figure 5:
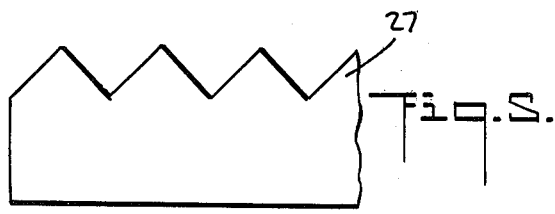
FIG. 5 shows a portion of the weir for the trough.
Figure 6:
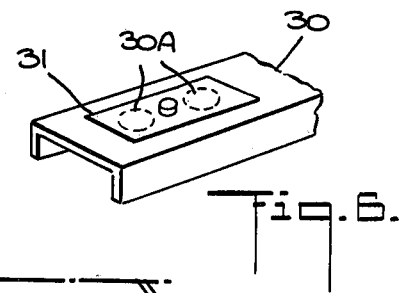
FIG. 6 illustrates, in perspective, the air diffuser duct installed in the trough.

Trough 24 is provided with weirs 27 and 28 so that water spills into the trough on both sides thereof. One such weir is shown in FIG. 5, where it will be seen that the weir has a sawtooth formation to permit the clarified tank water to spill into the trough. Trough 24 is supported on brackets 29 which are immersed in the water. The opposing sides 25A and 25B of the hood rest on brackets 29 so that they partially protrude into the water to function as scum baffles which are integral with the hood, thereby dispensing with the need as in FIGS. 2 and 3, with separate baffles and supports therefor.

The hood is preferably molded in sections of fiberglass reinforced plastic or similar material which is non-reactive with the otherwise corrosive gases generated within the confined hood region. Side 25A is provided with a sliding inspection door D or a port of plexiglass to facilitate inspection without having to raise the hood. This port also serves to admit outside air to the extent dictated by the gas-control arrangement to transport the gases.

In situations where it is desirable to enhance the stripping action, mounted on the base of trough 24 is a manifold duct 30 having ports 30A therein which are covered by an overlying flexible or elastomeric cover plate 31. The duct is coupled to a pump 32 which supplies air under pressure thereto, which pressure is exerted on the cover plate to flex to open the ports, the air bubbling out of the manifold ports acting to agitate the effluent to promote the release of the gases entrained therein.

The interior region of the hood is coupled by a suction pump 32 to a gas-control system 33, the resultant negative pressure within the confined hood region resulting in the withdrawal of the noxious gases for treatment by chemicals in the control system to render these gases inactive.

Instead of withdrawing the noxious gases from the confined hood region, the hood may be sealed and chlorine, ozone or other oxidant introduced therein to react with the hydrogen sulfide to produce soluble sulfite or sulfate compounds which are safe and non-odoriferous. These compounds are carried out with the effluent, thereby obviating the need for a downstream gas control system. Also, in practice, the hood may be provided with a solid gas absorbent material such as activated carbon.

Second Embodiment

In the arrangement shown in FIG. 7, the effluent trough 34 has a rectangular cross section and is mounted against the concrete wall of a settling tank or basin by means of anchor bolts. The trough rests on a bracket 35 also anchored on the concrete wall of the tank. The trough, in this instance, is adapted to receive clarified water from the free side only, this side having a weir 36 attached thereto.

Covering trough 34 is a hood 38 having a sloped top wall anchored on the concrete tank wall. The side wall 38A of the hood lies against the upright stand 39 mounted on this bracket 35, the side wall protruding into the water to function also as a scum baffle.

The hooded outlet arrangement shown in FIG. 4 is especially useful for rectangular tanks, in which case the trough and hood have a straight line formation, while that shown in FIG. 7 best lends itself to use in a round settling tank, in which case the outlet structure is circular. The hooded trough in FIG. 7 may be provided with an air duct and the other features disclosed in connection with FIG. 4, and it operates in a similar manner to prevent the discharge of noxious gases into the atmosphere.

While there has been shown and described a preferred embodiment of a Gas-Extraction Arrangement for Wastewater Settling Tank in accordance with the invention, it will be appreciated that many changes and modifications may be made therein without, however, departing from the essential spirit thereof.

I claim:

1. In combination with a settling tank for a wastewater treatment, said tank including an inlet line for feeding wastewater therein, means to remove sludge from the tank and an outlet zone defined by an effluent trough, at least one side of which has a weir to permit clarified water to spill into the trough; and an outlet to remove clarified water from said trough; an arrangement for preventing noxious gases generated in the wastewater from being discharged into and fouling the atmosphere, said arrangement comprising:
   A. a hood which is supported over the trough to define a confined region to capture said gases, said hood having a side wall which protrudes into the water in said settling tank at a position spaced from the weir side of the trough, said side wall protruding into the water to a depth below the upper edge of the weir to form a scum baffle integral with the hood; and
   B. means to treat the captured gases to render them inactive, and to prevent the discharge of said noxious gases into the atmosphere.

2. An arrangement as set forth in claim 1, wherein said hood is formed by a series of sections each being made of fiberglass plastic material.

3. An arrangement as set forth in claim 1 wherein said trough has weirs on both sides thereof and said hood has two side walls each spaced from a respective weir to function as scum baffles.

4. An arrangement as set forth in claim 1, wherein the other side of the trough is secured to the side of the tank, said hood having a top wall secured to said tank and a side wall spaced from the weir side of the trough.

5. An arrangement as set forth in claim 4, wherein said top wall is sloped.

6. An arrangement as set forth in claim 1, wherein said means to treat the captured gases include means drawing the gases from the confined region into a gas-control system.

7. An arrangement as set forth in claim 1, wherein said means to treat the captured gases include means introducing an oxidant into the confined region.

8. An arrangement as set forth in claim 7, wherein said oxidant is chlorine.

9. An arrangement as set forth in claim 7, wherein said oxidant is ozone.

10. An arrangement as set forth in claim 1, wherein said means to treat the captured gases include an activated carbon body disposed within the hood.

11. An arrangement as set forth in claim 1, wherein said hood is provided with an adjustable air admission port.

12. An arrangement as set forth in claim 1, further including means to introduce pressurized air into the effluent conducted by said trough to promote the release of gases entrained in the effluent.

13. An arrangement as set forth in claim 12, wherein said means by which pressurized air is introduced includes a manifold duct running along the base of the trough.

14. An arrangement as set forth in claim 13, wherein said trough is supported by a submerged bracket on which the sides of the hood rest.

15. An arrangement as set forth in claim 13, wherein said duct is provided with a port over which lies a flexible closure plate that is caused to flex by the pressurized air in said duct to open the port.

16. An arrangement as set forth in claim 1, wherein said weir has a sawtooth edge and the side wall of the hood extends to a depth in the tank water below this edge.

* * * * *